Patented June 10, 1952

2,600,202

UNITED STATES PATENT OFFICE 2,600,202

METHOD FOR POLYMERIZING CHLOROTRI-FLUOROETHYLENE

David W. Caird, Pittsfield, Mass., assignor to General Electric Company, a corporation of New York No Drawing. Application June 28, 1950,
Serial No. 170,945

11 Claims. (Cl. 204—158)

This invention is concerned with a method for making polymeric chlorotrifluoroethylene. More particularly, the invention is concerned with a process for making high molecular weight, substantially heat-stable polymeric chlorotrifluoroethylene which comprises (1) forming an aqueous suspension of a mixture of ingredients having a pH below 5 and comprising (a) chlorotrifluoroethylene, (b) water, (c) boric acid, (d) a water-soluble inorganic peroxide polymerization catalyst for (a), and (e) a water-soluble iron salt and (f) an agent readily oxidized in the presence of the polymerization catalyst and the aforesaid iron salt, for instance, a reducing agent, and (2) agitating the suspension, while maintaining said pH value, in the presence of ultraviolet light for a time sufficient to form polymeric chlorotrifluoroethylene.

One of the objects of this invention is to prepare polymeric chlorotrifluoroethylene.

A further object of the invention is to obtain polymeric chlorotrifluoroethylene in good yields.

Another object of the invention is to obtain polymeric chlorotrifluoroethylene having a high softening point.

A still further object is to obtain polymeric chlorotrifluoroethylene in a finely-divided form which can be advantageously employed for various applications.

It has been known heretofore, as disclosed in U. S. Patent 2,393,967, that tetrafluoroethylene can be polymerized in an aqueous system to obtain polymeric tetrafluoroethylene. In such instances, little difficulty is encountered in obtaining the polymer. However, when an attempt is made to apply the same conditions of reaction disclosed in this patent to the polymerization of monomeric chlorotrifluoroethylene, certain serious difficulties are encountered, among these being poor yields, low softening point and unsatisfactory heat-stability of the polymer, etc.

I have now discovered unexpectedly that by employing a particular combination of conditions of reaction, I am able to obtain from the monomer good yields of polymeric chlorotrifluoroethylene having outstanding properties. More particularly, I have discovered that by conducting the polymerization of the chlorotrifluoroethylene in an aqueous suspension while concurrently irradiating the suspension with ultraviolet light in the presence of certain activating agents, I am able to obtain polymeric chlorotrifluoroethylene having all the desirable properties mentioned above.

As stated previously, a particular combination of ingredients and conditions is necessary to accomplish the objects of this invention. The first condition which is necessary in the practice of my invention is that the reaction be conducted in the form of an aqueous suspension. Bulk polymerization of the chlorotrifluoroethylene gives poor yields. If the polymerization is conducted in the form of an emulsion using typical emulsifying systems comprising, for instance, potassium persulfate and an emulsifying agent, low molecular weight polymers are obtained. In addition, the yield is reduced and in many cases polymerization of the chlorotrifluoroethylene is even entirely inhibited. Moreover, the polymer is contaminated with these emulsifying agents and it is difficult to remove them. Thus, it has been found that when using emulsifying agents such as, for example, dioctyl sodium sulfosuccinate (Aerosol-OT), and diamyl sulfosuccinate (Aerosol-AY) with potassium persulfate, the yields of polymer were 6.6% and 23.5%, respectively, while the softening point of the polymer was well below 200° C.

In contrast to the above results when emulsifying agents are used, I am able to realize under most conditions yields ranging from about 90% up to almost 100% of the polymer, based on the starting weight of the monomeric chlorotrifluoroethylene. In preparing the suspension of the chlorotrifluoroethylene, the ratio of water to monomer is preferably varied within certain limits. Thus, on a weight basis, I may use a ratio of from 0.7 to 8 parts water per part of monomeric chlorotrifluoroethylene. When the ratio of the water to the monomer is above 8 to 1, the yield of polymer begins to decrease. When the ratio of the water to monomer is below 0.7 to 1, it becomes difficult to continue the polymerization due to the large bulk of polymer, and as a result the formed slurry is difficult to handle and agitate. In addition, longer times are required to effect polymerization when the water to monomer ratio is below 0.7 to 1.

As another condition for effecting the present method of polymerization, it has been found advantageous to use a small amount of boric acid ($H_3BO_3$) in the polymerizable mixture. The boric acid functions as a stabilizer for the catalyst and also controls the rate of catalytic effect. The use of boric acid has the advantage over borax disclosed in U. S. Patent 2,393,967 in that better yields of the polymer are obtained under otherwise comparable conditions. If the boric acid is omitted entirely in my process, and all other conditions are maintained, only negligible yields of polymer are obtained.

The amount of boric acid employed may be varied within fairly broad limits. Satisfactory results have been obtained when the weight of the boric acid based on the weight of the water in the aqueous suspension ranges from about 0.1 to 1%, by weight, preferably from 0.2 to 0.8%, by weight. Smaller or larger amounts of boric acid may be employed, however, and I do not intend to be limited to any particular range thereof. Good results have been obtained when the molar ratio of total borate ion to mols of catalyst is equal to about 3 to 1.

To realize the results described above, it is essential to employ polymerization catalysts which are soluble in water, particularly water-soluble inorganic peroxides. Among such catalysts which may be used are, for example, sodium persulfate, potassium persulfate, ammonium persulfate, sodium perborate, hydrogen peroxide, salts of true per acids such as, for instance, perphosphates, percarbonates, etc.; substitute products of hydrogen peroxide, for instance, zinc peroxide, barium peroxide, etc. The amount of inorganic peroxide employed may also be varied within wide limits, for instance, from about 0.005 (which appears to be a critical lower value for optimum yields) to 5%, by weight, based on the water. In many instances, I prefer to use an alkali-metal perborate as the catalyst in an amount ranging from approximately 0.3 to 1%, by weight, or I may use hydrogen peroxide in an amount ranging from 0.01 to 0.15%, by weight.

In conducting the reaction for effecting polymerization of the chlorotrifluoroethylene, I have found that it is essential to employ a water-soluble iron salt, e. g., a ferric or ferrous salt. Among such water-soluble iron salts which may be employed are, for example, soluble ferric phosphate (containing a small amount of citrate ion), ferric chloride, ferric citrate, ferric tartrate, ferric laurate, ferric pyrophosphate, ferrous ferrilactophosphate, ferric glycerophosphate, sodium ferripyrophosphate, sodium ferritriphosphate, potassium ferricyanide, sodium ferrinitride, sodium nitroprusside, potassium ferrocyanide, ferrous thiosulfate, ferrous thiocyanate, ferric thiocyanate, sodium ferrothiocyanate, etc. These iron salts are preferably present in small amounts of the order of from about 0.01 to 0.05%, by weight, based on the weight of the water. Under many conditions the use of these iron salts within the range of from 0.01 to 0.03%, by weight, gives the best yield of polymer. However, it will be understood that larger or smaller amounts may be employed without departing from the scope of the invention.

In addition to the above-mentioned iron salt, I may use an agent which is oxidized in the presence of the polymerization catalyst and iron salt or iron promoter. By means of this agent, an equilibrium is set up whereby the ferric ion is reduced to the ferrous ion which in turn reacts with the catalyst or polymerization accelerator to liberate OH ions. The ferrous ion remains in the ferrous state due to the presence of the reducing agent. Various such agents which may be employed are, for example, sodium bisulfite, potassium bisulfite, sodium hydrosulfite, ($Na_2S_2O_4$); other oxidizable sulfoxy and sulfur-containing compounds, e. g., sulfurous acid, sulfites, hydrosulfites, thiosulfates, sulfides, sulfoxalates, etc.; oxidizable compounds of nitrogen including hydroxylamine, hydrazine, etc.; sugars, e. g., fructose, sucrose, dextrose, glucose, etc.; polyhydric phenols, e. g., catechol, resorcinol, pyrogallol, etc. The amount of the reducing agent may be varied, for instance, from about 0.005 to 1%, by weight, based on the water and is not critical although it is preferably present in an amount ranging from about 0.01 to 0.5%, by weight. Further examples of similar or equivalent compounds which may be employed in this system may be found, for instance, in U. S. Patents 2,380,473–477.

In connection with the use of the polymerization catalyst, I have found it advantageous, especially in the presence of metals, to use such stabilizers for the catalyst as, for instance, sodium silicate, trisodium phosphate, etc. These stabilizers which may be present in amounts ranging from about 0.001 to 0.1%, by weight, based on the weight of the water are too small to function as buffering agents and their only advantage in the reaction mass is as stabilizers for the catalyst.

Throughout the reaction, the pH of the mass must be maintained below 5, preferably within the range of, for instance, from about 1.8 to 3, in order to realize the advantageous results described above. It has been found that above the pH of 5 there is a drop in the rate of reaction and polymer yield.

In general, the pH may be obtained by adding acidic materials such as HCl, $H_2SO_4$, chloroacetic acid, fluoroacetic acid, etc., to the reaction mass prior to effecting polymerization, in sufficient amount to bring the pH within the desired range. Additionally, acids may be formed in situ which can regulate the pH by controlled hydrolysis of the chlorotrifluoroethylene in the presence of air or oxygen. This may be accomplished by evacuating the aqueous system, partially or completely breaking the vacuum with known quantities of air or oxygen and then introducing the chlorotrifluoroethylene. Under the latter circumstance, the reaction between the monomer and the air is on a mol-to-mol basis (hydrolyzed monomer to oxygen). As a result of the controlled hydrolysis there are obtained such acidic materials as, e. g., HCl, HF $(COOH)_2$ in the reaction mass. The procedure for controlling the pH by controlling the hydrolysis of the monomer usually varies with each reaction vessel and, as will be apparent to those skilled in the art, can be determined in each instance. When using strong acids capable of giving the desired pH, it is advantageous to exclude air from the reaction mass and to maintain a blanket of an inert atmosphere, for example, a blanket of nitrogen, over the reaction mass, or employ a vapor of the monomer as the atmosphere above the reaction mass.

As a still further necessary condition for practicing my invention, it is essential that irradiation with ultraviolet light of the reaction mass should occur throughout the course of the reaction. Any ready source of ultraviolet or actinic light may be employed. One method comprises effecting the polymerization in a reaction vessel whose walls are pervious to the rays of ultraviolet light, for example, a reaction vessel having quartz walls. Another method comprises immersing an irradiating tube by means of a quartz well in the reaction mixture during the course of reaction. Without the presence of ultraviolet light, the effect of my claimed polymerization system unexpectedly is lost. This is not true in the case of other polymerizable monomers where, for instance, redox systems are employed and where no ultraviolet light is necessary for taking advantage of such a system.

Throughout the reaction, agitation is preferably employed. I have found that if agitation of the reaction mixture is omitted during the course of polymerization there is a considerable slow-down in the rate of reaction. Since the monomeric chlorotrifluoroethylene is a gas at normal temperatures and pressures, it is advantageous to conduct the reaction in a closed vessel under super-atmospheric pressure. I have found it satisfactory to operate the reaction under the autogenous pressure of the reactants in the closed vessel, for instance, at the vapor pressure of the monomer. In such instances, I have found that pressures varying, for example, from 70 to 150 p. s. i., preferably from 85 to 115 p. s. i., are advantageously employed. However, I do not intend to be limited to these particular pressures since as far as can be determined, they are not particularly critical and under many conditions of reaction higher or lower pressures may be employed without departing from the scope of the invention.

One of the most important advantages of my process for preparing polymeric chlorotrifluoroethylene resides in the fact that relatively low temperatures can be employed as compared to other processes including the polymerization of different monomers which may require relatively higher temperatures. Thus, I may use temperatures ranging, for example, from about 0° to 35° or 40° C., preferably from about 0° to 30° C., in which range the most advantageous utilization of the combination of ingredients and conditions is realized. At temperatures above 40° or 45° C., the yield of polymer drops off fairly sharply. In addition, at above these latter temperatures the catalyst decomposes too rapidly and tends to give low molecular polymers having low softening points.

The time in which my reaction is consummated may, of course, be varied within wide limits depending, for example, on the concentration of the water-monomer ratio, impurities and contaminations in the reaction mass (which should be kept to a minimum), rate of agitation, oxidizable material used, concentration of iron salt, degree of ultra violet radiation, etc. Generally, I have found that times of the order of from about 20 to 80 hours, for example, from 24 to 48 hours, are sufficient within which to complete the reaction.

In order that those skilled in the art may better understand how the present invention may be practiced, the following examples are given by way of illustration and not by way of limitation. All parts are by weight:

EXAMPLE 1

This example illustrates the effect of using a system containing boric acid in contrast to the use of borax as disclosed in U. S. Patent 2,393,967.

Pyrex reaction tubes were charged with aqueous systems containing, by weight, the following ingredients:

*Table 1*

|  | Sample A | Sample B |
|---|---|---|
|  | Parts | Parts |
| Distilled water | 1,000 | 1,000 |
| Sodium perborate | 6 | 6 |
| Borax (sodium tetraborate) | 6 | |
| Boric acid | | 4 |
| Sodium phosphate | 0.1 | 0.1 |
| Sodium silicate | 0.2 | 0.2 |
| Sodium bisulfite | 1.0 | 1.0 |
| Water-soluble ferric phosphate | 0.2 | 0.2 |
| Chlorotrifluoroethylene | 1,130 | 1,210 |

Each of the above formulations was sealed in a Pyrex reaction tube and agitated by rocking for 48 hours at 27° C. while the tube was exposed to irradiation from an ultraviolet lamp. Atmospheric air occupied 46% of the tube volume in sample A, and 44% of the tube volume in sample B. In the case of sample A, the pH of the aqueous system at the end of the reaction was 2.65 and the yield of polymer was 790 parts (70% of the monomer charged). In the case of sample B, the pH of the aqueous system at the end of the reaction was 2.18 and the yield of the polymer was 1110 parts (92% of the monomer charged).

The foregoing example illustrates the improvement in yield realized by using boric acid in place of borax.

EXAMPLE 2

This example illustrates the comparison of using boric acid and borax together with the other ingredients employed in the practice of my invention when polymerization is carried out in a nitrogen atmosphere as compared to the use of an air atmosphere as in Example 1. The example also illustrates the effect of using hydrogen peroxide with the boric acid.

*Table 2*

|  | Sample A | Sample B | Sample C |
|---|---|---|---|
|  | Parts | Parts | Parts |
| Distilled water | 1,000 | 1,000 | 1,000 |
| Hydrogen peroxide | | | 1.43 |
| Sodium perborate | 6 | 6 | |
| Borax (sodium tetraborate) | 6 | | |
| Boric acid | | 4 | 6.4 |
| Sodium phosphate | 0.1 | 0.1 | 0.1 |
| Sodium silicate | 0.2 | 0.2 | 0.2 |
| Sodium bisulfite | 1.0 | 1.0 | 1.0 |
| Water-soluble ferric phosphate | 0.2 | 0.2 | 0.2 |
| Chlorotrifluoroethylene | 902 | 608 | 608 |

Each of the above formulations was introduced into a Pyrex reaction tube, with the exception of the chlorotrifluoroethylene. The solution was frozen at around −76° C., degassed by evaporation with a vacuum pump and the chlorotrifluoroethylene was condensed in the tube. The tube was sealed under a nitrogen atmosphere and reacted with rocking agitation for 24 hours at 27° C. in the case of samples B and C, and for 48 hours at 27° C. in the case of sample A. At the end of these respective times, there was obtained in the case of sample A, 195 parts of polymer representing a 20.7% yield based on the weight of the monomer charged, sample B showed a yield of 325 parts of polymer representing a 53.3% yield (the pH of the aqueous system being about 2.22), and sample C showed a yield of about 551 parts polymer representing a 90.5% yield (the pH of the aqueous system being around 1.6).

This example illustrates clearly the advantage of using boric acid in place of borax. It also demonstrates that in an inert atmosphere the use of hydrogen peroxide offers advantages over the use of sodium perborate, while when the reaction is conducted in the presence of air, sodium perborate gives better yields of polymer than is obtainable using hydrogen peroxide as the catalyst.

EXAMPLE 3

This example illustrates the effect on polymer yield of varying the pH of the polymerization system by the addition of varying amounts of hydrochloric acid to the formulation of sample C of Example 2 using hydrogen peroxide as a catalyst. The ingredients and conditions were identical with this latter sample C of Example 2. The polymer yield with relation to the amount of hydrochloric acid is disclosed in the following table:

*Table 3*

| Parts HCl | Parts Ploymer | Percent Polymer Yield |
|---|---|---|
| 0.0 | 551 | 90.5 |
| 0.365 | 503 | 82.7 |
| 0.729 | 465 | 76.5 |
| 2.202 | 253 | 41.5 |

EXAMPLE 4

This example is concerned with a direct comparison of the effect of using sodium perborate or hydrogen peroxide as polymerization catalysts when an atmosphere of air is maintained over the polymerization systems. In one case, identified as sample X, the identical ingredients as disclosed in sample B of Example 2 were used and in the other case, identified as sample Y, the same ingredients as disclosed in sample C of Example 2 were employed. However, the only difference from the conditions of Example 2 was that instead of using a nitrogen atmosphere, each of the Pyrex reaction tubes was sealed with an atmosphere of air (which occupied 53% of the volume of the tube); each tube was reacted similarly as in Example 2. In the case of the use of sodium perborate (sample X), there was obtained 564 parts of polymer representing a 92.5% yield based on the monomer charged (final pH of the system was 1.75). In the case of sample Y, there was obtained 492 parts of polymer representing a 80.8% yield (final pH of 1.75).

EXAMPLE 5

In this example a Pyrex reaction tube was charged with an aqueous system containing, by weight, 100 parts distilled water, 0.143 part hydrogen peroxide, 0.6 part boric acid, 0.01 part sodium phosphate, 0.2 part sodium silicate, 0.10 part sodium bisulfite, and 0.02 part soluble ferric phosphate. Thereafter, 60.8 parts of monomeric chlorotrifluoroethylene were introduced as in Example 2 and the tube sealed under nitrogen atmosphere. The tube was reacted with rocking agitation for 24 hours at 23° C. in the total absence of ultraviolet light. Reaction was completely inhibited. However, when the system was subsequently reacted with rocking agitation for 24 hours at 23° C. but exposed to irradiation from ultraviolet lamp, there was obtained 46.4 parts of polymer representing a 76% yield of the monomer charged.

EXAMPLE 6

In this example, Pyrex (quartz) reaction tubes were charged with the same ingredients as employed in sample B of Example 1 with the exception that the following amounts of chlorotrifluoroethylene were substituted in place of the 1210 parts chlorotrifluoroethylene employed in sample B. The table below also shows the parts of polymer obtained, the percent conversion of the monomer, and the final pH of the reaction mass employing the identical reaction conditions disclosed for sample B in Example 1.

*Table 4*

| Monomer, Parts | Polymer, Parts | Percent Conversion | Final pH |
|---|---|---|---|
| 1,432 | 1,212 | 85.0 | 2.1 |
| 1,128 | 1,056 | 93.5 | 2.1 |
| 563 | 530 | 94.5 | 2.3 |

The following Example 7 illustrates a more detailed procedure for carrying out the polymerization of the chlorotrifluoroethylene in accordance with my invention employing conditions comparable to those which might be encountered in large-scale production.

EXAMPLE 7

A 30-gallon capacity glass-lined reaction kettle was charged with an aqueous system comprising, by weight, 1000 parts distilled water, 6 parts sodium perborate, 6 parts boric acid, 0.1 part sodium phosphate, 0.2 part sodium silicate, 1 part sodium bisulfite, and 0.2 part soluble ferric phosphate. The kettle was flushed with nitrogen gas, evacuated to 26″ vacuum and atmospheric air introduced to 8″ vacuum. About 204 parts of trifluorochloroethylene was charged under pressure. The system was exposed to irradiation from an ultraviolet lamp introduced into the kettle by means of a quartz well, and agitated by means of a motor driven anchor type stirrer at 27° C. to 31° C. A reaction pressure of 95 p. s. i. to 110 p. s. i., depending on the reaction temperature, was maintained for 48 hours at which time a sharp drop in pressure indicated completion of the reaction.

There were obtained 123 parts of polymer as a stable suspension of polymer in the aqueous system, and 36 parts of polymer which had precipitated from the suspension, or a total of 159 parts of polymer representing a yield of 78% of the initial monomer charge.

It has been found that the sodium bisulfite or equivalent material used with the water-soluble iron salt may be omitted if a small amount of an acidic material, for example, hydrochloric acid, etc., is added to bring the pH of the starting system below 5, for example, around 2 to 3. The amount of acid added may, of course, be varied as long as the pH is brought down below 5. If this acidic material is not added, the sodium bisulfite is advantageously employed. The following examples illustrate the effect of this addition of hydrochloric acid to a system where sodium bisulfite is absent.

EXAMPLE 8

Glass reaction tubes previous to ultraviolet rays were charged with an aqueous system containing, by weight, 1000 parts distilled water, 0.171 part hydrogen peroxide, 6.5 parts boric acid, 0.1 part sodium phosphate, 0.2 part sodium silicate, 0.2 part soluble ferric phosphate, and 0.182 part hydrochloric acid. Sodium bisulfite was added in an amount equal to 0.25 part in one case and was omitted in another formulation. The two formulations were frozen at −76° C., degassed, charged with 208 parts of degassed chlorotrifluoroethylene, sealed under vacuum, reacted with rocking agitation for 24 hours at 22° C. while being exposed to irradiation from an ultraviolet lamp. The table below shows the yields in both cases.

| Parts Sodium Bisulfite | Parts Polymer | Per Cent Conversion | Final pH |
|---|---|---|---|
| 0.0 | 196 | 94 | 2.06 |
| 0.25 | 191 | 92 | 2.00 |

EXAMPLE 9

This example illustrates the effect of omitting the sodium bisulfite while varying the hydrogen peroxide catalyst concentration. A series of test reaction tubes were charged with the same formulation as in Example 8 with the exception that the hydrogen peroxide was varied in the respective formulations. The following table shows the polymer yield compared to the concentration of hydrogen peroxide used.

| Parts Hydrogen Peroxide | Parts Polymer | Per Cent Conversion |
|---|---|---|
| 0.0 | 2.2 | 1.1 |
| 0.034 | 60.5 | 29 |
| 0.051 | 123 | 59 |
| 0.068 | 190 | 91 |
| 0.171 | 196 | 94 |

EXAMPLE 10

This example shows the effect on the rate of polymerization of varying the soluble ferric phosphate while using HCl in place of sodium bisulfite. The same formulation and conditions were employed as in Example 8 with the exception that the soluble ferric phosphate was varied in accordance with the table below to give the results described.

| Parts Soluble Ferric Phosphate | Parts Polymer | Per Cent Conversion |
|---|---|---|
| 0.0 | 2.7 | 1.3 |
| 0.05 | 96 | 46 |
| 0.1 | 172 | 83 |
| 0.2 | 196 | 94 |

It will, of course, be apparent to those skilled in the art that other conditions of reaction as well as different modifying ingredients other than those used in the foregoing example may be employed without departing from the scope of the invention. Many examples of such modifying ingredients as, for example, catalysts, iron salts, buffering agents, and monomer-to-water ratios which may be employed have been given previously.

The polymers obtained in accordance with my claimed process are tough and have high softening points. In addition, many of the polymers do not melt under a pressure of 75 p. s. i. up to a temperature of about 220° C. and are quite stable and do not decompose or evolve gas below 250° C.

The polymers prepared in accordance with my method find a large number of valuable applications. Because of their substantial inertness, they are eminently suitable for applications requiring resistance to various chemical reactants. In addition, because of their heat-stability at elevated temperatures they are advantageously employed as gaskets and valve packings where other materials can not withstand the corrosive attack or elevated temperatures. Electrical conductors of all sorts such as wires, motor armatures, and cables can be insulated with the polmeric chlorotrifluoroethylene, such insulated conductors being particularly useful because of the inertness of the insulating polymers.

Polymeric chlorotrifluoroethylene has been found to be highly suitable as insulation for electrical conductors in which the surface beneath and immediately adjacent to the polymer is an aluminum-type surface. Electrical conductors of this type are more particularly disclosed and claimed in the co-pending application of Edward J. Flynn and Gerald W. Young, Serial No. 54,636, filed October 15, 1948, and assigned to the same assignee as the present invention.

If desired, dispersions of the polymer or solutions thereof may be used to coat and impregnate various fillers such as asbestos, glass fibers, aluminum powders, or sheets or hard surfaces of various materials, as, for example, metal molds, glass cloth, asbestos cloth, etc. Such treated materials may be molded under heat and pressure to yield useful objects. In the case of the treated sheets, the latter may be superimposed on each other and molded to give a laminated panel having outstanding heat resistance and good electrical properties.

What I claim as new and desire to secure by Letters Patent of the United States is:

1. The process for making polymeric chlorotrifluoroethylene which comprises (1) forming an aqueous suspension of a mixture of ingredients having a pH below 5 and comprising (a) water, (b) chlorotrifluoroethylene, (c) boric acid, (d) a water-soluble inorganic peroxide polymerization catalyst for (b), (e) a water-soluble iron salt, and (f) a compound oxidizable in the presence of the polymerization catalyst and the iron salt, said oxidizable compound being selected from the class consisting of oxidizable sulfur-containing compounds, oxidizable nitrogen-containing compounds, oxidizable sugars, and oxidizable polyhydric phenols, and (2) agitating the aforesaid suspension, while maintaining said pH value, in the presence of ultraviolet light for a time sufficient to form the polymeric material.

2. The process for making polymeric chlorotrifluoroethylene which comprises (1) forming an aqueous suspension of a mixture of ingredients having a pH below 5 and comprising (a) water, (b) chlorotrifluoroethylene, (c) boric acid, (d) a water-soluble inorganic peroxide polymerization catalyst for (b), (e) a water-soluble iron phosphate, and (f) a compound oxidizable in the presence of the polymerization catalyst and the iron salt, said oxidizable compound being selected from the class consisting of oxidizable sulfur-containing compounds, oxidizable nitrogen-containing compounds, oxidizable sugars, and oxidizable polyhydric phenols, and (2) agitating the aforesaid suspension, while maintaining said pH value, in the presence of ultraviolet light for a time sufficient to form the polymeric material.

3. The process for making polymeric chlorotrifluoroethylene which comprises (1) forming an aqueous suspension of a mixture of ingredients having a pH below 5 and comprising (a) water, (b) chlorotrifluoroethylene, (c) boric acid, (d) hydrogen peroxide, (e) a water-soluble iron salt, and (f) a compound oxidizable in the presence of the hydrogen peroxide and the iron salt, said oxidizable compound being selected from the class consisting of oxidizable sulfur-containing compounds, oxidizable nitrogen-containing compounds, oxidizable sugars, and oxidizable polyhydric phenols, and (2) agitating the aforesaid suspension, while maintaining said pH value, in the presence of ultraviolet light for a time sufficient to form the polymeric material.

4. The process for making polymeric chlorotrifluoroethylene which comprises (1) forming an aqueous suspension of a mixture of ingredients having a pH below 5 and comprising (a) water, (b) chlorotrifluoroethylene, (c) boric acid, (d) sodium perborate, (e) a water-soluble iron salt, and (f) a compound oxidizable in the presence of the sodium perborate and the iron salt, said oxidizable compound being selected from the class consisting of oxidizable sulfur-containing compounds, oxidizable nitrogen-containing compounds, oxidizable sugars, and oxidizable polyhydric phenols, and (2) agitating the aforesaid suspension, while maintaining said pH value, in the presence of ultraviolet light for a time sufficient to form the polymeric material.

5. The process for making polymeric chlorotrifluoroethylene which comprises (1) forming an aqueous suspension of a mixture of ingredients having a pH below 5 and comprising (a) water, (b) chlorotrifluoroethylene, (c) boric acid, (d) hydrogen peroxide, (e) a water-soluble iron phosphate, and (f) a compound oxidizable in the presence of the hydrogen peroxide and the iron salt, said oxidizable compound being selected from the class consisting of oxidizable sulfur-containing compounds, oxidizable nitrogen-containing compounds, oxidizable sugars, and oxidizable polyhydric phenols, and (2) agitating the aforesaid suspension, while maintaining said pH value, in the presence of ultraviolet light for a time sufficient to form the polymeric material.

6. The process for making polymeric chlorotrifluoroethylene which comprises (1) forming an aqueous suspension of a mixture of ingredients having a pH below 5 and comprising (a) water, (b) chlorotrifluoroethylene, (c) boric acid, (d) sodium perborate, (e) a water-soluble iron phosphate, and (f) a compound oxidizable in the presence of the sodium perborate and the iron salt, said oxidizable compound being selected from the class consisting of oxidizable sulfur-containing compounds, oxidizable nitrogen-containing compounds, oxidizable sugars, and oxidizable polyhydric phenols, and (2) agitating the aforesaid suspension, while maintaining said pH value, in the presence of ultraviolet light for a time sufficient to form the polymeric material.

7. The process for making polymeric chlorotrifluoroethylene which comprises (1) forming an aqueous suspension of a mixture of ingredients having a pH below 5 and comprising (a) water, (b) chlorotrifluoroethylene, (c) boric acid, (d) a water-soluble inorganic peroxide polymerization catalyst for (b), (e) a water-soluble iron phosphate, and (f) sodium bisulfite, and (2) agitating the aforesaid suspension, while maintaining said pH value, in the presence of ultraviolet light for a time sufficient to form the polymeric material.

8. The process for making polymeric chlorotrifluoroethylene which comprises (1) forming an aqueous suspension of a mixture of ingredients having a pH below 5 and comprising (a) water, (b) chlorotrifluoroethylene, (c) boric acid, (d) hydrogen peroxide, (e) a water-soluble iron phosphate, and (f) sodium bisulfite, and (2) agitating the aforesaid suspension, while maintaining said pH value, in presence of the ultraviolet light for a time sufficient to form the polymeric material.

9. The process for making polymeric chlorotrifluoroethylene which comprises (1) forming an aqueous suspension of a mixture of ingredients having a pH below 5 and comprising (a) water, (b) chlorotrifluoroethylene, (c) boric acid, (d) sodium perborate, (e) a water-soluble iron phosphate, and (f) sodium bisulfite, and (2) agitating the aforesaid suspension, while maintaining said pH value, in the presence of ultraviolet light for a time sufficient to form the polymeric material.

10. The process for making polymeric chlorotrifluoroethylene which comprises (1) forming an aqueous suspension of a mixture of ingredients having a pH below 5 and comprising (a) water, (b) chlorotrifluoroethylene, in which the water is present, by weight, in an amount equal to from 0.7 to 8 parts water per part of chlorotrifluoroethylene (c) from 0.1 to 1%, by weight, boric acid based on the weight of the water, (d) a water-soluble inorganic peroxide polymerization catalyst for (b), (e) from 0.01 to 0.05%, by weight, of a water-soluble iron salt based on the weight of the water, and (f) from 0.005 to 1%, by weight, based on the weight of the water of a compound oxidizable in the presence of the polymerization catalyst and the iron salt, said oxidizable compound being selected from the class consisting of oxidizable sulfur-containing compounds, oxidizable nitrogen-containing compounds, oxidizable sugars, and oxidizable polyhydric phenols, and (2) agitating the aforesaid suspension, while maintaining said pH value, in the presence of ultraviolet light for a time sufficient to form the polymeric material.

11. The process for making polymeric chlorotrifluoroethylene which comprises (1) forming an aqueous suspension of a mixture of ingredients having a pH below 5 and comprising (a) water, (b) chlorotrifluoroethylene, in which the water is present, by weight, in an amount equal to from 0.7 to 8 parts water per part of chlorotrifluoroethylene, (c) from 0.1 to 1%, by weight, boric acid based on the weight of the water, (d) hydrogen peroxide, (e) a water-soluble iron phosphate, and (f) sodium bisulfite, and (2) agitating the aforesaid suspension, while maintaining said pH value, in the presence of ultraviolet light for a time sufficient to form the polymeric material.

DAVID W. CAIRD.

REFERENCES CITED

The following references are of record in the file of this patent:

UNITED STATES PATENTS

| Number | Name | Date |
| --- | --- | --- |
| 2,393,967 | Brubaker | Feb. 5, 1946 |

OTHER REFERENCES

Ellis et al.: Chemical Action of Ultraviolet Rays (1941), pages 410–11.